(No Model.) 6 Sheets—Sheet 1.
C. D. ROGERS.
MACHINE FOR MAKING SCREW BLANKS.
No. 386,091. Patented July 10, 1888.
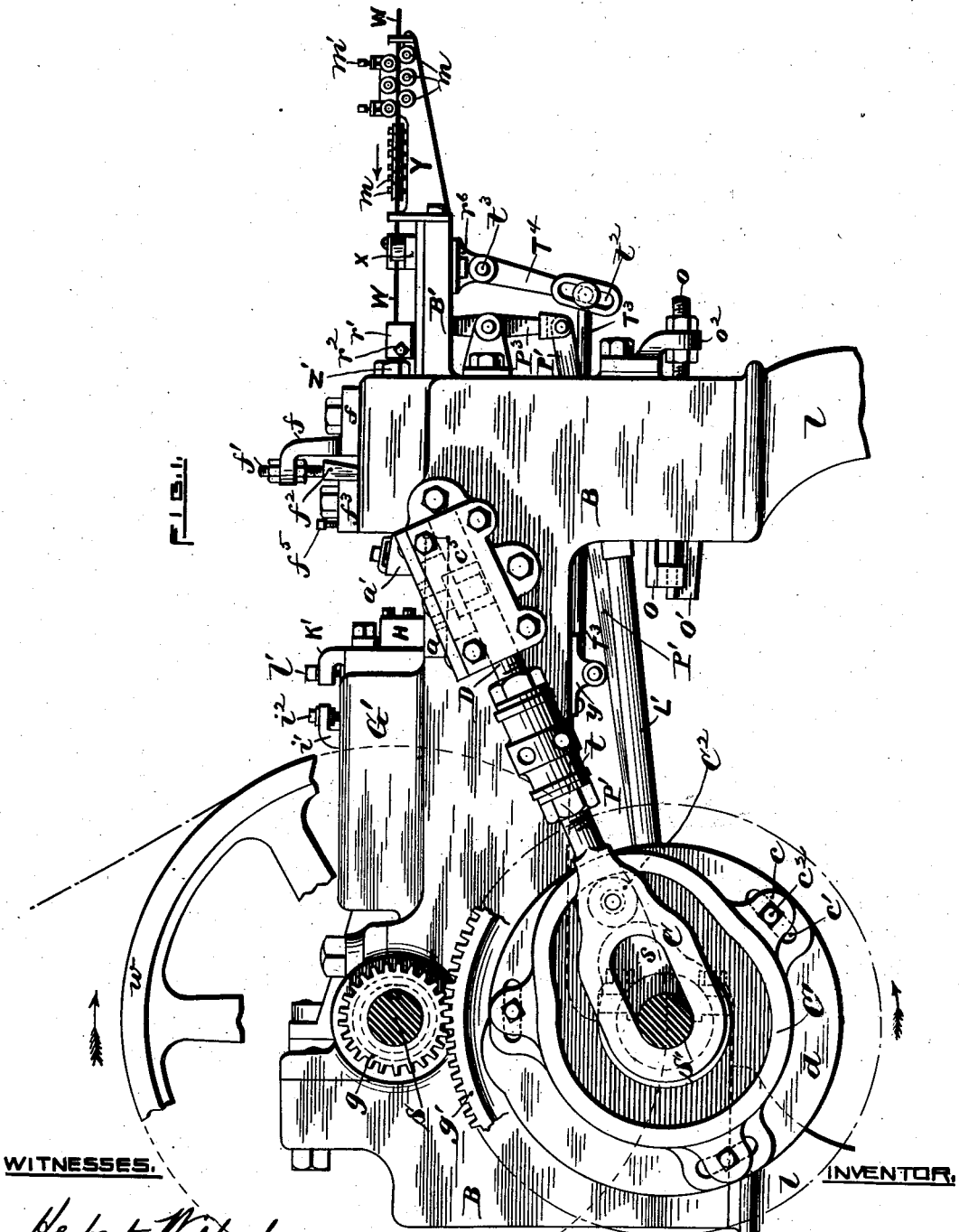
WITNESSES.
Herbert Wilford.
Charles Hannigan.
INVENTOR.
Charles D. Rogers.
by Remington & Henthorn
Attys.

(No Model.) 6 Sheets—Sheet 2.
C. D. ROGERS.
MACHINE FOR MAKING SCREW BLANKS.
No. 386,091. Patented July 10, 1888.
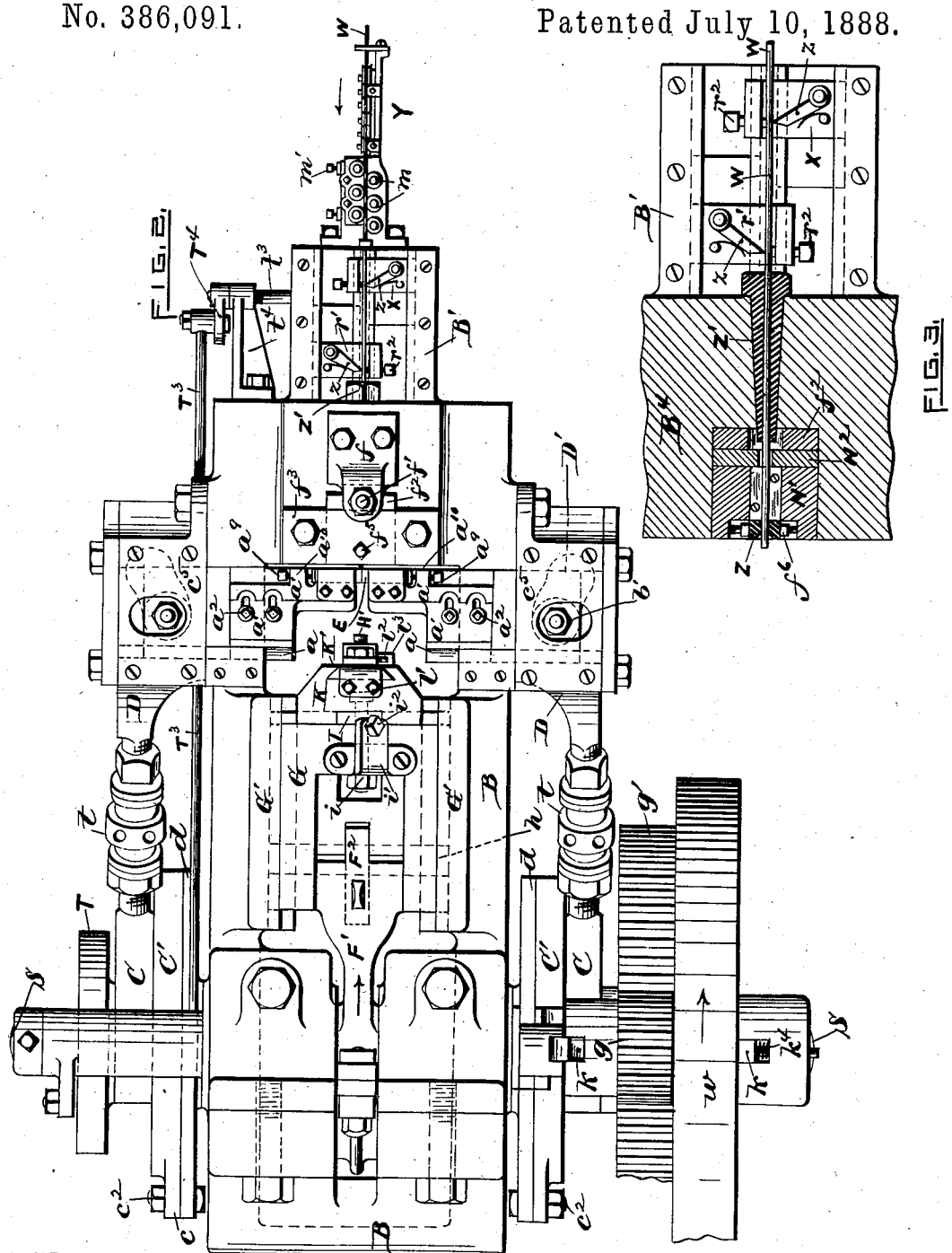
WITNESSES,
Herbert Wilford
Charles Hannigan
INVENTOR,
Charles D. Rogers.
by Remington & Hawthorn
Attys

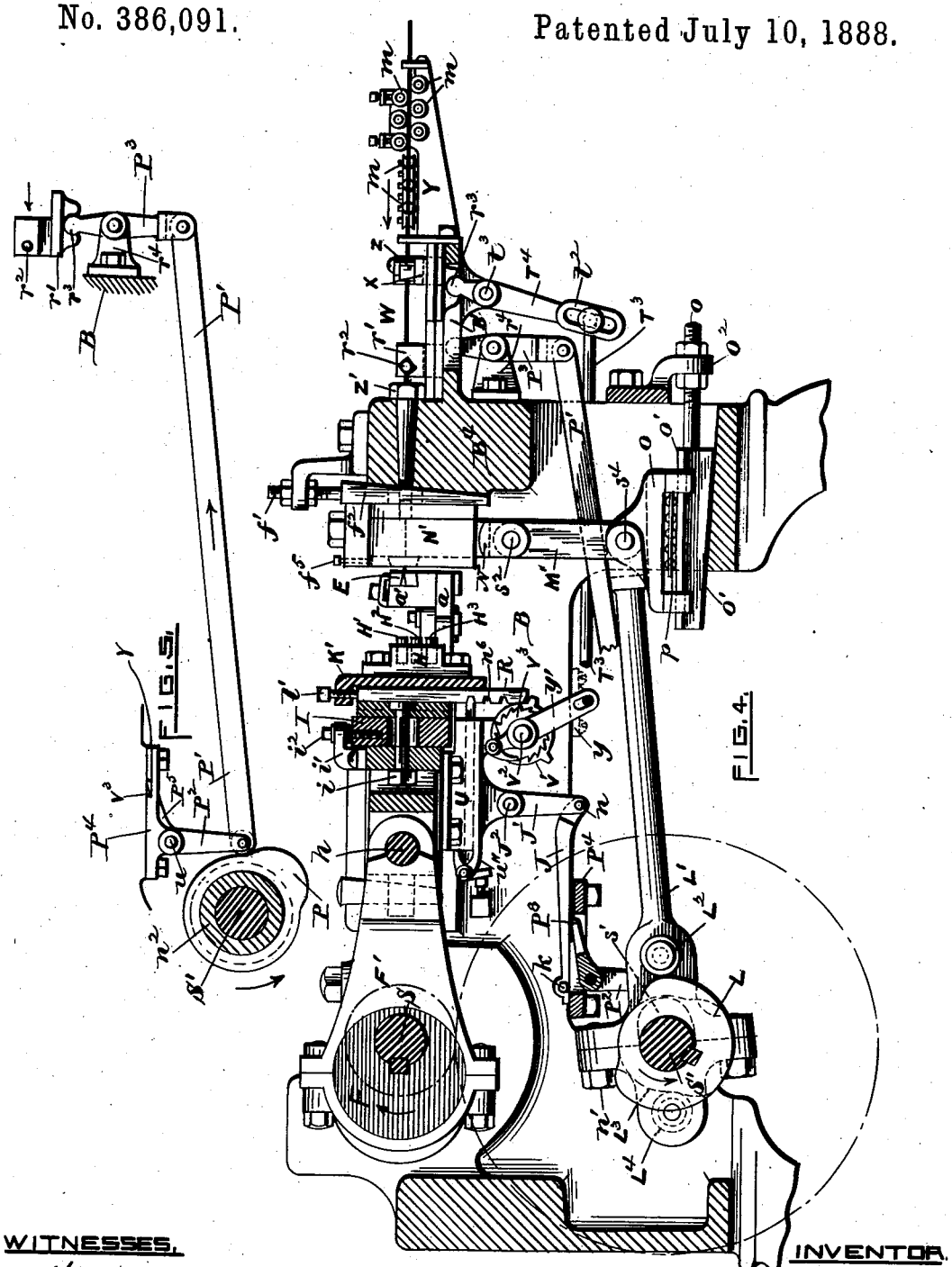

(No Model.) 6 Sheets—Sheet 4.
C. D. ROGERS.
MACHINE FOR MAKING SCREW BLANKS.
No. 386,091. Patented July 10, 1888.
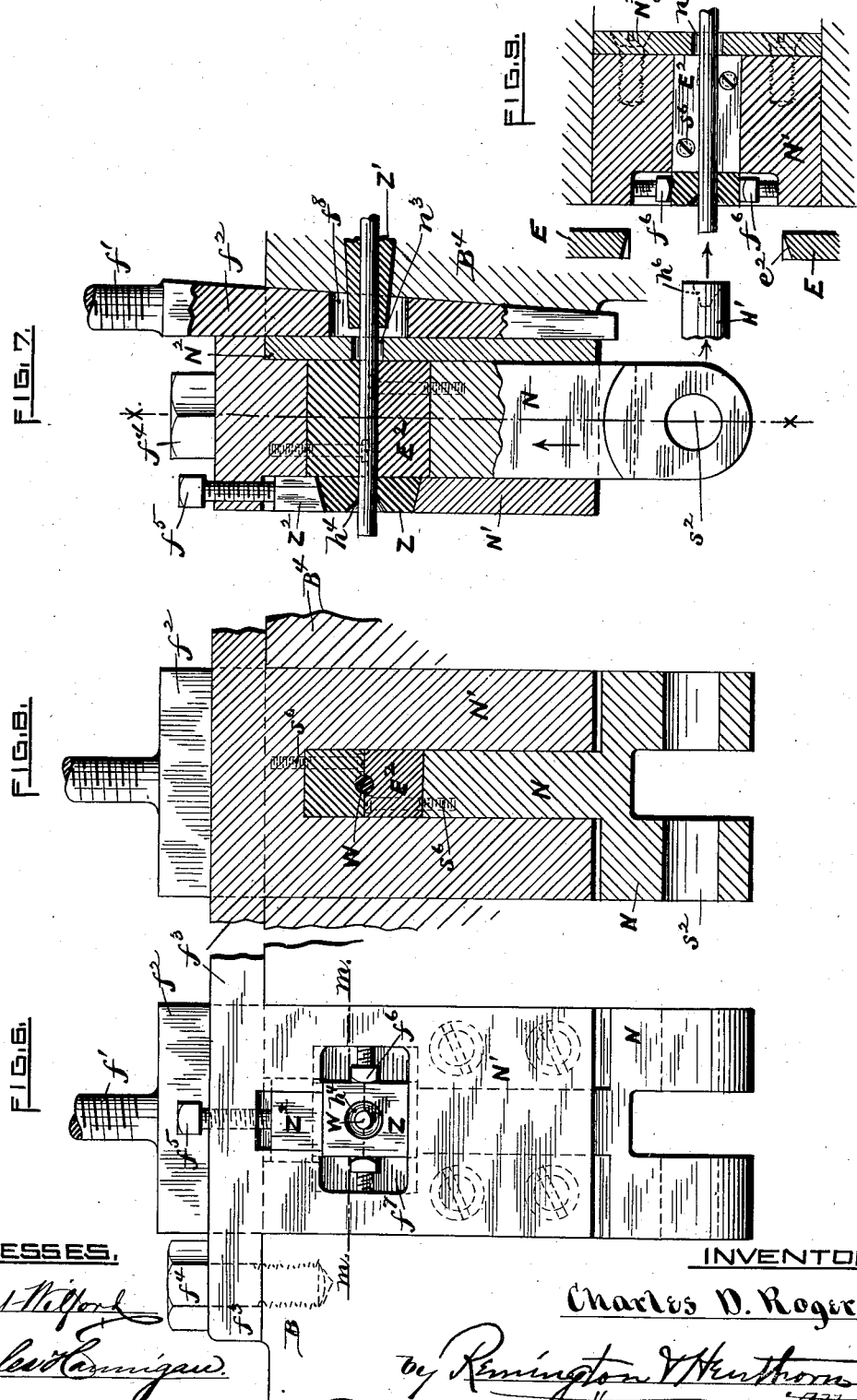
WITNESSES.
Herbert Wilford
Charles Hannigan
INVENTOR
Charles D. Rogers.
by Remington & Hawthorn
Attys.

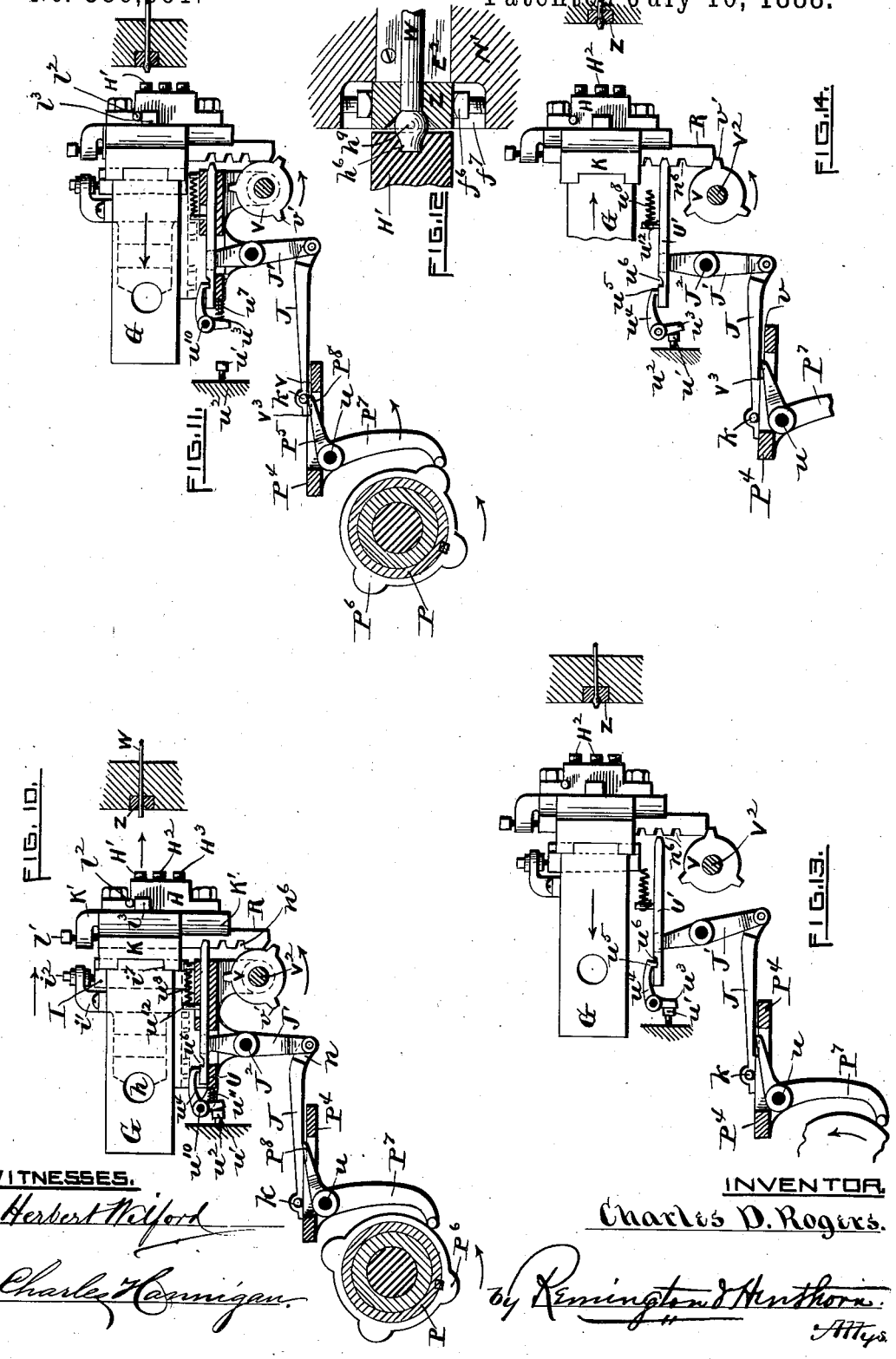

(No Model.) 6 Sheets—Sheet 6.
C. D. ROGERS.
MACHINE FOR MAKING SCREW BLANKS.
No. 386,091. Patented July 10, 1888.
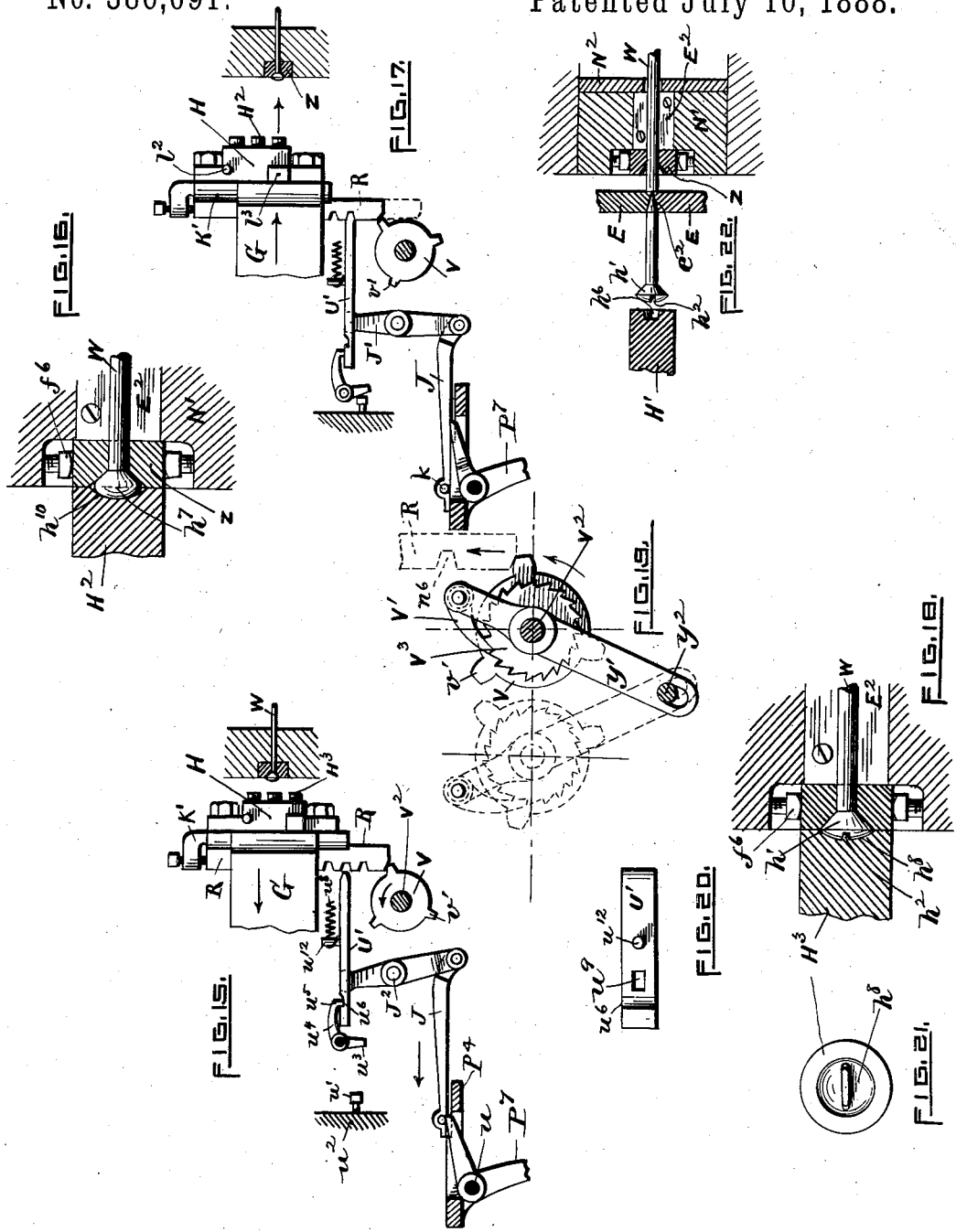
WITNESSES. INVENTOR.
Herbert Wilford Charles D. Rogers.
Charles Hannigan by Remington & Henthorn.
Attys.

United States Patent Office.

CHARLES D. ROGERS, OF PROVIDENCE, RHODE ISLAND, ASSIGNOR TO THE AMERICAN SCREW COMPANY, OF SAME PLACE.

MACHINE FOR MAKING SCREW-BLANKS.

SPECIFICATION forming part of Letters Patent No. 386,091, dated July 10, 1888.

Application filed July 7, 1887. Serial No. 243,657. (No model.)

*To all whom it may concern:*

Be it known that I, CHARLES D. ROGERS, a citizen of the United States, residing at Providence, in the county of Providence and State of Rhode Island, have invented certain new and useful Improvements in Machines for Automatically Making Screw-Blanks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the manufacture of screws known as "wood-screws," as heretofore commonly practiced, the heads are formed by forging in a die, upsetting the metal at one end of a wire of which a screw is to be formed by the action of what are called "heading-hammers," two of which are sometimes employed in turn. The heads produced by the action of such hammers and dies are subsequently shaved to give them the precise shape and size required and a suitably-finished surface, and a slot is cut across the face of the head to receive the blade of a screw-driver. Dies of two kinds have been used for the purpose of forging the heads of screws, known, respectively, as "solid" dies and "open" dies, the former being made of one piece of metal and the latter of two symmetrical pieces, each forming one-half of a die. Open dies are held together when the metal is forged in them, and are opened or separated to release the metal.

The primary object of the inventions I am about to describe is to form finished heads of a larger size relatively to the wire from which the screw is formed than has been commonly done heretofore by the operation simply of forging or upsetting, and without the subsequent operations of shaving and slotting and trimming. These objects involve the use of solid dies, which present no seam or fissure on the surface upon which the screw-heads are to be formed, the marks of which would show upon the surface of heads formed in them. It involves also the use of three or more hammers which are successively brought into action, two of which at least must have faces shaped with especial reference to the form of the head and of the slot to be produced. Such hammers form the subject of another application for patent filed by me upon even date herewith; but mechanism for locking the several hammers in the position which they must occupy when acting on the metal form a part of my inventions herein described.

The necessity for the use of three hammers in forming large heads or the advantage in their use arises from the fact that the increased amount of metal required can be obtained only by increasing the length of the part of the wire to be upset, and an increase in the length renders the wire more liable to "cripple" or bend under the action of a single hammer, or even of two, in such a manner as to make it impossible to produce the symmetrical form required, or a sound and strong head.

In an application for a patent upon an improved rolled screw, filed by me in the United States Patent Office May 11, 1887, Serial No. 237,823, the diameter of the threaded portion is considerably larger than the wire from which it is formed, and as the head should have a certain relation to the threaded portion of the screw it has become necessary or desirable to increase the size of the heads relatively to the wire from which they are formed.

The machine hereinafter described is designed to meet the requirements of the improved screw referred to.

Though the primary object of these inventions is the making of screw-heads of larger size relatively to the wire employed than has been customary heretofore, they are applicable to the making of screw-heads of ordinary size.

The production of a finished head involves the necessity of carefully adjusting the amount of metal to be upset to the size of the cavity between the die and the face of the finishing-hammer when it is closed down upon the die. If the amount is too small, the cavity will not be filled and the head will be imperfect. If the amount is too large, a portion of it will escape from under the hammer and form a fin around the edge or angle of the head, which must be subsequently removed. An accurate feeding mechanism is required for this purpose, and such a mechanism forms a part of my invention. A solid die has through it a cylindrical hole of the size of the wire to be acted upon, enlarged into a cavity or mouth, usually conical, forming the die proper and the counterpart of the shape of the head to be produced. In upsetting the metal into this cavity the wire in the cylindrical hole is so expanded as to make its removal a matter of difficulty when the die cannot be opened. A special device for starting the wire from this hole after the upsetting has been effected forms another part of my invention. It is desirable that the upsetting of the head shall be effected before the piece of wire which shall form a blank is severed from the coil of which it is a part. To do this it is necessary to provide a device which shall firmly grasp the wire on the side of the die opposite to the heading-hammers and hold it rigidly against the thrust of such hammers, and then release it to the action of the feeding mechanism. Such a device forms another part of my inventions.

Although the primary object of these inventions is, as above stated, to produce a finished head which shall not require to be subsequently shaved or nicked, yet some or all of them can be usefully employed where heads are produced which are to be shaved or nicked.

In the accompanying six sheets of drawings, Figure 1, Sheet 1, represents a front side view, in elevation, of a machine embodying my improvements adapted for making screw-blanks, &c., a portion of the driving mechanism being removed. Fig. 2, Sheet 2, is a plan of the complete machine, showing the several parts in position to commence the first stroke. Fig. 3 is an enlarged plan view of the feeding mechanism in partial horizontal section. Fig. 4, Sheet 3, is a vertical longitudinal sectional view taken substantially through the center of the machine, showing the several connections, &c., as in use and corresponding to the position shown in Figs. 1 and 2. Fig. 5 is a side view showing the mechanism for starting the wire ahead a short distance in the solid die subsequently to having the head formed thereon, or, in other words, the "starting-feed." Fig. 6, Sheet 4, is an end view (enlarged) showing means for adjustably securing the solid die in position in the die-holder. Fig. 7 is a vertical sectional view taken through the center of the die and holder, showing a wire clamped in position to be headed. Fig. 8 is a vertical sectional view taken through the line $x\ x$ of Fig. 7, showing the gripping-jaws, &c. Fig. 9 is a horizontal sectional view taken on the irregular line $m\ m$ of Fig. 6, showing the wire in position in the die and extending therefrom a proper distance to be upset and headed by the heading-hammers, one of which is shown in the act of moving forward for the purpose. Fig. 10, Sheet 5, is a partial longitudinal vertical sectional view showing the devices for automatically and intermittently operating the heading-hammers and locking them in position. The hammer-block is shown as locked and the several parts moving forward upon the first stroke to upset the end of the wire extending from the die, the latter in its relative position, together with the corresponding or first heading-hammer, being shown enlarged in said Fig. 9. Fig. 11 is a similar sectional view showing the metal upset and forming a partly-shaped head on the end of the wire, the hammer-block, &c., moving rearwardly, the locking bolt by means of such movement having been withdrawn from the hammer-block preparatory to bringing the second hammer into position. Fig. 12 is an enlarged sectional view showing the metal upset, corresponding to Fig. 11. Fig. 13 represents the hammer-block, &c., still moving rearwardly (some of the minor parts, however, being omitted) and nearly at the end of the stroke, the second hammer in the meantime having been brought into position in line with the wire and the bolt's locking-lever in the act of being automatically released. Fig. 14 is a partial side view of the mechanism just described, the said locking-lever having been tripped and the bolt advanced into engagement with the vertically-mounted notched bar, which latter carries the hammer-holder, thereby retaining the parts in position until the second heading-hammer engages the wire to further shape the head of the screw-blank, the hammer-block, &c., now entering upon the second forward stroke. Fig. 15, Sheet 6, corresponds to the position of the several parts as described with reference to Fig. 11, the second hammer having made its blow upon the upset metal, thereby impressing it into the die and nearly filling the same. Fig. 16 is an enlarged sectional view showing the die with the head therein. Fig. 17 shows the slotting or third-stroke hammer locked in position, advancing to finish the head and at the same time to impress the screw-driver slot therein, the relative position of the locking device being substantially the same as just described with reference to Figs. 10 and 14. Fig. 18 is an enlarged sectional view of the die, showing the completely-formed head therein as finished and slotted by the third hammer. Fig. 19 is an enlarged side view showing the device for automatically operating the star-wheel which elevates the hammers, the position thereof corresponding with that shown in Fig. 15. Fig. 20 is a top view of the bolt. Fig. 21 is an inverted end view of the third hammer, showing the die-cavity and tongue for forming the screw-driver slot. Fig. 22 is a horizontal sectional view showing the cutting-off dies in the act of severing a finished blank from the end of the wire.

I would state that the right-hand end of the machine as drawn in Fig. 1, wherein the wire first enters, is termed the "front end," the side of the machine represented in said figure being the "front side." Consequently the two main shafts are located at the rear end of the machine, the cams for operating the feeding mechanism being located at the rear or back side of the machine.

The following is a detailed description of the present invention:

In describing the several devices embodied in my improved machine I will as far as practicable point out as I proceed the several parts or elements constituting each novel feature and the manner of its operation, followed by a description setting forth their joint operation as a whole.

B, again referring to the drawings, designates the main framing of the machine, the same comprising the transverse heavy girder-like front and rear portions united by two parallel sides, the whole made of iron and resting on legs $l$. The rear portion is fitted with upper and lower boxes or main bearings, in which are mounted shafts S S', respectively. The front portion of said frame is provided with the forward extension, B', in which is mounted the feeding mechanism, while still forward of the extension B', and forming the extreme front end of the machine, is secured thereto the straightening device Y. This latter feature, however, is old and in common use. Intermediate of the front and rear portions of the frame B, and in the same horizontal plane with the upper shaft, are formed raised guides or ways G', uniting with the parallel sides before referred to. These ways are planed out to receive the cross-head G, which is adapted to reciprocate freely back and forth therein. The front end or girder, $B^4$, of the frame is drilled and fitted to receive the wire-guide Z', (see Fig. 3, &c.,) the same forming the longitudinal center of the machine. It will be seen now that a line drawn horizontally would pass through the center of the following parts, viz: the straightening device, the feeding-dogs, the guide Z', the lateral center between the ways, and the transverse center of the upper shaft. This latter-named shaft S projects beyond the outer face of the bearings, and is provided in front with the loosely-mounted pinion $g$, having a hub turned to receive the main driving-pulley $w$, the pulley and pinion being keyed together to revolve in unison.

$k$ is a key having an enlargement at each end fitted to move endwise in the shaft to engage a notch formed in the hub of the wheel by means of a cam and connections, as usual in stop-motions of this character, and to which I make no claim. This arrangement serves to intermittently revolve the upper shaft.

An eccentric, F, having a "throw" or stroke equal to or exceeding the length of the screw-blank to be produced, is secured to the upper shaft intermediate of the bearings. (See Fig. 2.)

F' indicates the strap or connection in halves and bolted together. The forward end of the strap is extended laterally and fitted to the cross-head pin $h$, $F^2$ being a short connection passing around the pin and keyed to the eccentric-strap. By means of this construction it will be noticed that the broad surface of the strap receives the powerful thrust or impact of the work transmitted to the cross-head G during the heading operation, &c., while the comparatively light work of withdrawing the hammers, &c., is borne by the narrow strap $F^2$.

To the front end of the lower shaft is secured a gear-wheel, $g'$, intergearing with and having a velocity ratio of one to four of the pinion $g$. This shaft also extends some distance beyond the outer faces of the boxes. A disk, $d$, is secured to the shaft S'. To the face of the disk is adjustably secured a cam, C', the attachment being effected by a series of bolts, $c^2$, passing through slotted openings $c'$, formed in the disk $d$ and ears $c$ of the cam, (see Fig. 1,) a similar arrangement being mounted upon the opposite end of the shaft.

C designates the main cam-connections, (one on each side of the machine,) each being slotted at $s$ to receive the shaft S'. A roll, $C^2$, is mounted on the back face of the front connection to engage the inner surface of the cam C'. The said connections are mounted at an angle, and are adapted each to move back and forth upon the shaft, the front one working between the hub of the gear-wheel and the front face of the disk's hub, the rear connection at the same time simultaneously working between the corresponding face of the rear disk and the hub of the "feed-cam" T. The upper or front end of the connection C is enlarged to form a rectangular head, D, in which is cut a cam-shaped opening, D', Fig. 2, to operate the combined pointing and cutting-off dies. The adjacent ends of the connection are screw-threaded—one right and the other left hand—the same being united by the correspondingly-tapped nut $t$. By means of this construction, together with the check-nuts, the length of the connection may be nicely adjusted.

T, as before stated, designates the main feed-cam, secured to the rear end of the lower shaft, its construction being such that the connection $T^3$ is vibrated back and forth while the cam is making about one-third of a revolution, the feed-block, &c., remaining stationary during the remainder of the revolution.

Referring to the head D of the cam-connection C, it will be seen, Figs. 1 and 2, that a box or housing, $c^5$, is secured to each side of the frame B, near the front end thereof. The lower portion of the box is planed out to receive the head, the upper portion being fitted to receive a plate, $a$, which carries a roll, $b'$, adapted to engage the cam-slot D', the frame B being planed out to also receive the same, a gib serving to retain it in place. The plate $a$ is fitted with a tool-holder, $a'$. By means of this construction, in connection with clamping-screws $a^2$, passing through slotted openings formed in the base of the holder $a'$ and tapped into the plate $a$, the lateral adjustment of the holder is effected. The combined pointing and cutting-off dies E are securely clamped to the inwardly-projecting extensions of the holders by bolts, a screw, $a^9$, passing through the ear $a^{10}$, serving as a means for longitudinally adjusting the dies, and at the same time receiving the end-thrust. It is evident now that the revolution of the cams C′ causes each head D, by means of its slot D′ and the roll $b'$, to accurately and simultaneously move the guided tool-holders, &c., in opposite endwise directions partly across the face of the solid head-forming die Z. The form of the cams C′ is such that the dies advance toward each other, point and sever the blank from the wire W, and immediately recede to the stationary or normal position, there remaining idle about two-thirds of a revolution of the cams.

The front portion, $B^4$, of the frame B, uniting the sides, is made very heavy, the back side thereof being planed out vertically through the center to receive the rectangular die-block N′, (see also Sheet 4,) said block being provided with the flange $f^3$, which is drilled to receive the holding-down bolts $f^4$, the latter being tapped into the frame. A steel tubular guide, Z′, is fitted longitudinally of the frame through the center, the same extending rearwardly to or nearly to the die-block N′. Practically the guide Z′ is drilled to the size of wire forming the blanks, an individual guide being required for each gage or size of wire used, the front end of said guide being close up to the dog of the starting-feed. The said die-block has an opening formed therein, which extends from the lower side up to and a short distance above the center of the wire. A gripping die, N, is fitted in said opening. The upper end of the grip is provided with the hardened-steel block $E^2$, secured thereto by screws $s^6$, a similar block being reversely secured to the upper end of the opening just described, a pair of blocks constituting the gripping-dies, the same being drilled or fitted to the wire W, a set being required for each size of wire used. A plate, $N^2$, secured to the forward face of the block, serves to retain the clamp in position vertically. The enlarged hole $n^3$ readily permits the entrance of various sizes of wire through the plate $N^2$ to engage the die $E^2$. A bracket is secured to the top of the frame B. Said bracket extends partly over the die-block N′, and is drilled to loosely receive the threaded stem $f'$ of the wedge-plate $f^2$, the latter being interposed between the block and the main frame for the purpose of effecting a very fine longitudinal adjustment between the solid die and the heading-hammers. A vertically-elongated hole, $f^8$, is formed in the center of the wedge-plate, into which the end of the tubular guide Z′ enters. A rectangular recess, $f^7$, is formed in the after face of the die-block, into which is loosely fitted the solid heading-die Z. The upper and lower sides of the die are oppositely beveled. A vertical recess opening into the said space $f^7$ is fitted with a gib or clamp, $Z^2$, which latter, by means of its engagement with the set-screw $f^5$, tapped into the block N′, firmly retains the heading-die Z in position. The lateral adjustment of the die is effected by the side screws, $f^6$. The said heading-die is drilled to receive the wire W. The outer portion of the hole is conical, as at $h^4$, thus producing a die-cavity which gives a corresponding shape to the under side of the finished screw-head $h'$.

It is obvious that other sizes of wire, as well as other forms of the die-cavity, would necessarily involve the employment of a corresponding number of dies. It will be observed that as the die Z used is made in one piece or solid, the heads of the blanks formed therein are smooth and uniform in size and appearance, and without the "fins" resulting from the use of two-part dies, which latter are, so far as I am aware, generally employed in heading screws.

The means for automatically clamping the wire in position while being headed and subsequently releasing the same preparatory to feeding it to the cutters is as follows: A cam, L, is secured to the lower shaft, S′, contiguous to the rear face of the front bearing, the shape of the cam being such that the wire is held by its action during about two thirds of a revolution of the shaft. (See Fig. 4.) Immediately to the rear of the cam is located the cam connection L′, its head being in halves and secured together by bolts $n'$. The shaft passes freely through the elongated opening $s'$. A truck-roll, $L^2$, is mounted on the front side of the forward portion of said connection-head, a similar roll being mounted on the opposite end at the rear thereof, which engages a cam, $L^3$, (shown dotted,) likewise secured to the shaft S′. This latter cam forms the counterpart, substantially, of the cam L′, just described. The connection L′ extends toward the front at a slight angle and is jointed at $s^4$ to the cross-head O, the downward thrust or pressure being borne by the cross-head, which is gibbed over the thrust-block O′, the latter, having a slightly-beveled under face, $o'$, fitting a corresponding surface formed in the frame B, Fig. 4. The thrust-block is provided with a screw-threaded stem, $o$, on its front end, which passes through an arm or bracket, $o^2$, secured to the frame, check-nuts serving to retain the thrust-block in position after the desired adjustment has been effected. This adjustment is necessitated by the slight wear in the gripping-dies, &c., incidental to continuous use, the horizontal movement of the cross-head being, say, two inches, while the resulting vertical travel is only about one-sixteenth of an inch, more or less, as determined by the position of the thrust-block O′.

$p$ indicates a series of anti-friction rollers interposed between the said cross-head and thrust-block, by means of which the friction between the two surfaces is reduced to a minimum.

The cam-connection L′ is jointed to the cross-head by the pin $s^4$, the cross-head and link M′ being fitted into each other at the toggle-joint, so as to relieve the pin from vertical thrust. The lower end of the gripper-block N is in like manner fitted and jointed at $s^2$ to the upper end of the said link M'. It is evident that as the cross-head travels back and forth, so, relatively, is the gripping-block intermittently slightly withdrawn from its engagement with the wire and again advanced to regrasp the same, the whole forming a very powerful and unyielding retaining device.

I will now more particularly point out and describe the two feeding devices, the same being so constructed and arranged that the first or short stroke starting-feed is employed to start the headed wire from the solid die Z, followed immediately by the action of the long-stroke or main feeding mechanism. A cam, P, mounted on the lower shaft, engages a truck-roll mounted at the point formed by the jointing of the connecting-rod P' and the short arm $P^2$, Fig. 5, the latter being loosely fulcrumed on a vibrating shaft, $u$, mounted in a plate, $P^4$, transversely secured to the under side of the frame B (near the lower shaft) and connecting the two parallel sides of said frame. A working-lever, $P^3$, is pivoted to a stand, $r^4$, secured to the front end of the main frame below the extension B', the lower end of said lever being jointed to the connecting-rod P', and the upper end of the lever being rounded off, as at $r^3$, to engage the base of the feed-block $r'$.

$r^2$ indicates an adjusting-screw mounted in the feed-block in line with the wire W, a spring-actuated steel pawl or dog, $z$, Fig. 3, being mounted opposite to the screw $r^2$. The free end of the pawl is beveled off and pointed so as to readily engage the wire. It is evident that the cam-shaped lug P, upon its engagement with the truck-roll, forces the rod P' ahead in the arrow direction, thereby at the same time forcing the feed-block $r'$ in the opposite or rearward direction. By means of this latter movement the point of the pawl $z$ is slightly embedded into the wire and moves it rearwardly a short distance, the pawl traveling to or nearly to the entrance of the guide Z'. The function of this device is to start the headed wire from the solid die Z, the wire intermediate of the die and feed-block being prevented from bending by the employment of the long guide Z'. The other or main feeding device is operated by a cam, T, secured to the lower shaft, and connection $T^3$. The latter is jointed at its front end to the lower or slotted portion, $t^2$, of the lever $T^4$, (see Fig. 4,) said lever being securely mounted on the rear end of the horizontal shaft $t^3$, the length of feed being regulated by the relative position of the connection $T^3$ to the shaft $t^3$. The shaft $t^3$, to which the lever $T^4$ is secured, is mounted in bearings. The upper end of said lever engages the base of a feed-block, X, constructed and provided with a spring-pawl, $z$, &c., substantially as just described with reference to the short-stroke feeding device. The two feed-cams P and T are relatively so arranged upon the shaft S' that the former starts the headed wire from the solid die and causes the coil or mass of wire to move slightly in advance of the cam operating the long-stroke feeding mechanism. The movement of the wire thus begun by the first feed is uninterruptedly continued and terminated by the second or main feeding device, the slot $t^2$, as stated, permitting the feed to be adjusted and controlled within its limits. The feed-blocks in returning to their normal position instantly release the spring-actuated dogs $z$ from the wire preparatory to re-engaging the same at the commencement of the next stroke.

The straightening device Y, although commonly employed, I will next briefly describe. The same consists of a frame secured to the front end of the machine, in which are mounted two series of small grooved rolls or wheels, $m$. Said wheels are set "staggering," some of them being adapted to be adjusted laterally by screws $m'$, &c., each wheel revolving freely on its stud or axis. It will be noticed that the first or outer set of wheels lie horizontally, while the rear series are arranged in a vertical plane. (See Figs. 1, 2, &c.) This arrangement is adapted to reduce all the bends or "kinks" while the wire passes between the grooved peripheries of the several wheels preparatory to being introduced into the dies, &c., by the feed-blocks.

Having thus described the several devices employed for straightening, feeding, and clamping the wire and the manner of automatically operating the same, I will now more particularly describe the arrangement for automatically forming a finished head on the end of the wire projecting from the rear face of the solid die Z. The said arrangement as drawn involves the successive use of three hammers, H' $H^2$ $H^3$, secured to the hammer-head H, the latter being adjustably secured and intermittently locked to a saddle or holder, K, which in turn is adjustably mounted in the cross-head G, the said cross-head being, as before stated, mounted horizontally in ways G', formed in the frame B, the cross-head being adapted to travel back and forth by means of its connection with the eccentric F. The front end of the cross-head is planed out at an angle across its vertical face to receive an inclined projection formed on the rear face of the vertically-mounted block I, and is drilled through its center to receive the tie-bolt $i$. The cross-head is also planed transversely across its front end, forming shoulders $i^7$, over which the saddle K is lipped and supported thereby. A bracket, $i'$, is secured to the top of the cross-head, in which is suitably mounted at an angle the adjusting-screw $i^2$, the latter engaging the correspondingly-tapped hole formed in the inclined projection before referred to. The block I has an elongated hole formed therein, through which said tie-bolt freely passes.

K designates the "saddle," so termed, the same having its rear face planed out vertically through the center to receive the block I. The opposite or front face of the saddle is vertically planed out in a dovetail form through the center to receive the hammer-head holder K' and the notched vertical bar R, the latter being adjustably secured to the holder K' by means of screws $l'$ passing through an ear formed on top thereof and into the upper end of the bar. One of said screws is tapped into the holder, the other serving as a set-screw, and being tapped into the ear and bearing against the upper end of the bar. A pin, $l^2$, extends from the front side of the holder, adapted to engage a lug, $l^3$, formed on the front end of the saddle for the purpose of limiting the downward movement of the hammer-head. The center bolt, $i$, passes through the saddle, its head being counterbored therein, (see Fig. 4,) thereby tying the several parts together. It is obvious now that by loosening the nut of the bolt $i$ (the hole therefor in the cross head being slightly elongated) and turning the screw $i^2$ in the proper direction, the saddle, with its attached parts, is adapted to be nicely adjusted laterally or transversely of the machine.

H, as stated, indicates the hammer-head, secured by bolts to the front vertical face of the holder K'. The face of the hammer-head projects sufficiently to receive the three heading hammers or dies H' H² H³, which are mounted in line above each other at the center of the machine. The head-forming cavities of the three hammers are made progressive—that is to say, the first-stroke hammer, H', by means of its die $h^6$, (Sheets 5 and 6,) is adapted to centralize the stock and form the preliminary head $h^9$ on the end of the wire W, resting in the solid die Z, as shown in Figs. 11 and 12. The second-stroke hammer, H², is then brought into position, and, by means of its die $h^{10}$ further compresses and shapes the preliminary head so as to assume the rounded and nearly-finished form $h^7$. (Shown in Fig. 16.) Finally, the last or third stroke hammer, H³, is brought into position and advanced, and by means of its ribbed cavity or die $h^8$ completely shapes the head $h'$ and swages the screw-driver slot or nick $h^2$ therein, as shown in Fig. 18.

It is obvious that by substituting hammers having other forms of die cavities or faces different styles and shapes of heads may be produced on the end of the confined wire. It is also obvious that each blow or stroke of the hammer necessitates one revolution of the driving-shaft S.

I will now point out the mechanical construction and the manner of automatically operating the several hammers, whereby the latter are each successively brought into position and locked preparatory to upsetting the wire and forming the head.

Referring to Sheets 5 and 6 of the drawings, it will be seen that a U-shaped frame, U, is secured by bolts to the under side of the main cross-head G. Said frame is provided at the front end on its lower side with depending ears, in which a shaft, V², is mounted to intermittently revolve. Similar ears, located further to the rear, carry a shorter shaft, J², to which is secured the vertical two-arm lever J', its lower end being jointed to the tripping-plate J. The upper end of the lever passes through a slot formed in the base of the frame U and engages an opening, $u^9$, formed in the locking plate or bolt U', Fig. 20. The rear end of the frame is provided with small ears $u^{11}$, drilled to receive a pin, $u^{10}$. A longitudinal opening is formed in the frame U, in which the bolt U' is adapted to move back and forth. To the top of the bolt is secured a pin, $u^{12}$, which extends up through a short slotted opening formed in the metal inclosing the bolt. A spring, $u^8$, connects the pin $u^{12}$ and the plate U, a notch or groove, $u^6$, being cut into the upper surface of the bolt at its rear end, into which a bell-crank spring-acting catch-lever, $u^4$, loosely mounted on the pin $u^{10}$, between the ears $u^{11}$, is, by means of its hook $u^5$, adapted to engage. The other arm, $u^3$, of the lever rests against the spring $u^7$, which acts to insure the engagement of the said hook and bolt.

The vertical bar R, as before described, is adjustably secured by screws $l'$ to the back of the holder K', the rear face of said bar being provided near its lower end with the three notches $u^6$, which are of the same pitch or spacing as the three hammers. These notches are so arranged in the bar with relation to the hammers that when engaged or locked by the bolt U' the center of a hammer will always stand in direct line with the center of the solid die Z, &c. A lug, $u^2$, secured to the frame B, is tapped to receive a screw, $u'$, the latter serving to trip or release the lever $u^4$ from the notch $u^6$. Now, it being remembered that the lever, &c., travels back and forth in unison with the cross-head G, it will be seen that as the arm $u^3$ comes in contact with the adjustable stationary stop $u'$ at or near the end of its stroke the hook $u^5$ is thereby forced from the notch, the spring $u^8$ at the same time drawing the bolt ahead into a notch, $u^6$, of the bar R. Immediately upon the commencement of the next forward stroke the spring $u^7$ forces the hook down upon the bolt, Fig. 17, ready to again re-engage the notch $u^6$ whenever the bolt is mechanically withdrawn from the bar R.

Referring again to the plate P⁴, in which is mounted the vibrating shaft $u$, Fig. 11, it will be seen that a tri-operating cam, P⁶, secured to the hub of the cam P, is adapted in its revolution to intermittently communicate slight angular movements to the arm or lever P⁵, secured to said shaft. A short forked arm, P⁵ P⁸, is also secured to this shaft directly under the center of the machine. The latter arm is mounted to form nearly right angles with the arm P⁷ and works in an enlarged opening formed in the plate P⁴. A portion of the upper surface of the plate is cut down slightly, as at $v$, to form a step or abutment, $v^1$, the forked ends P⁸ of the arm P⁵ extending in front and forward of said abutment.

J, Fig. 10, &c., designates a plate, which I term a "tripping-plate," jointed at its front end, $n$, to the lower end of the vertical lever J'. The rear end of said plate is adapted to engage the shoulder $v^3$, just described. Short lateral pins $k$ project from each side of the plate near its rear end. The object of the cam $P^6$ is to cause the forked ends of the short lever $P^5$, when bearing against the under side of the pins $k$, to trip the plate J from the shoulder $v^3$ at the proper time, or, in other words, after a hammer has delivered its blow against the end of the wire at the end of the forward stroke, (the bar R meanwhile being locked in position by the bolt and the plate J at the same time engaging the abutment $v^3$.) Then at the commencement of the return stroke the movement of the frame U, &c., in conjunction with the (for the time being) stationary plate J, together with the moving lever J' and its fulcrum, forcibly withdraws the bolt U' from its notch $u^6$ until the spring-actuated bell-crank lever $u^4$ engages the notch $u^6$. At the same instant, however, or immediately thereafter, the said cam $P^6$ engages its lever $P^7$, which, by vibrating the shaft $u$, causes the ends $P^8$ of the forked lever to rise against said pins $k$, thereby forcing the plate J up from the abutment $v^3$. During the remainder of the stroke the plate slides rearwardly along the top surface of the stationary plate $P^4$, with the bolt still withdrawn, until its retaining or bell crank lever $u^4$ is tripped by coming in contact with the stop $u'$ just prior to the end of the stroke, thereby allowing the bolt to re-engage another notch $u^6$, as before. Upon the return or forward stroke the several parts move in unison until the plate J, by its gravity, again re-engages the shoulder $v^3$. After the blow is delivered, the bolt is then withdrawn, as before described. During the time occupied in making the back stroke, while the holder K', &c., is thus unlocked, the mechanism about to be described is brought into action. The object of this latter device is to automatically place the three heading-hammers successively in position. This device is mounted upon the shaft $V^2$, supported by the depending ears formed on the under side of the frame U at its forward end. Referring to Sheet 6 of the drawings, it will be seen that the said shaft $V^2$ is located a little to the rear of the notched vertical bar R. A three-teeth star-wheel, V, is secured to the shaft directly back of the bar, the width or face of the wheel and bar being substantially the same. The three teeth or spurs $v'$ of the star-wheel are adapted to engage the lower end of the bar R, to elevate the same, by the intermittent angular movement of the shaft and wheel. A ratchet tooth wheel, $V^3$, is secured to each end of the shaft $V^2$. The front end of the star-wheel shaft extends sufficiently to loosely receive a pawl, carrying lever, $y'$, Figs. 4 and 19, which is pivoted at its lower slotted end to a bracket, $y$, secured to the under side of the main framing, the pivot pin $y^2$ passing loosely through said slot of the lever $y'$. A pawl, V', is connected to and carried by the upper end of the lever, said pawl, in connection with the ratchet wheel $V^3$, &c., serving to intermittently revolve the shaft. A check-pawl pivoted to the rear side of the carriage or frame U and engaging a rear wheel prevents the shaft $V^2$ from moving in the opposite direction while the several parts are being carried forward. This ratchet-feeding arrangement is clearly shown enlarged in Fig. 19, wherein the full-line position corresponds to that shown in Fig. 15. The movement of the frame U in the back-stroke serves, by means of the pawl V' and its ratchet wheel, to revolve the star-wheel in the arrow direction, a lug, $v'$, at the same time engaging the lower end of the bar R and forcing it upward. At the termination of said back-stroke the shaft $V^2$ will have been turned one-ninth of a revolution, (see dotted position,) thereby elevating the bar and bringing a hammer in position to engage the end of the wire. The bar thus elevated and locked is represented in Fig. 17 in the act of traveling forward, the new stroke having just commenced.

The machine having been constructed, arranged, and adjusted substantially as shown and hereinbefore described, the gears $g$ $g'$, having a proportion of one to four, respectively, the revolution thereof would operate the several devices as follows: The wire, however, is first assumed to be clamped in position and projecting beyond the solid die Z the proper distance, the hammer-holder K', &c., at the same time being supported by the lug $l^3$ and pin $l^2$ at the lowest position and locked by the bolt U', as in Fig. 10. Now, in revolving the upper shaft the cross-head G advances on its first forward stroke, and by means of the corresponding hammer, H', produces the preliminary operation $h^9$ on the end of the wire. (See Fig. 12.) Immediately upon the commencement of the return-stroke and coincident therewith, (the plate J at the time engaging the shoulder $v^3$ and being stationary,) the action of the lever J' withdraws the bolt U' from the upper notch $u^6$ against the tension of the spring $u^8$, and causes its notch $u^6$ to engage the lever $u^4$. Thereupon a lug of the continuously-revolving cam $P^6$ forces the plate J upward from the shoulder $v^3$, (see Fig. 11,) after which the several mentioned parts travel to the end of the back-stroke. Just prior to the end, however, the lever $u^4$, by means of its engagement with the stop $u'$, releases the bolt, thereby permitting the latter (connected with the spring $u^8$) to enter the middle notch of the vertical bar and lock the same. (Fig. 13 shows the stop in the act of tripping the lever.) During the said return stroke, while the bar R is still unlocked, the movement of the frame or carriage U, &c., also carries the pawl-lever $y'$ rearwardly, thereby rotating the star-wheel V one-ninth of a revolution, and by means of a tooth, $v'$, thereof elevating the bar and the attached second-stroke hammer, H², into position, or, in other words, in line with the center of the machine, all the foregoing being performed during one revolution of the upper shaft. The hammer H², &c., thus locked is represented in Fig. 14 as just entering upon the second stroke. At the forward end of this stroke the die-cavity of the hammer H² shapes the head, as shown in Fig. 16. The cross-head, &c., next recede to complete the second stroke. During this movement the bolt U' is withdrawn, as before described.

In Fig. 15 the star-wheel V is represented as in the act of lifting the bar R with its hammers to the third or highest position. An enlarged view of said wheel, &c., is shown in Fig. 19, the dotted position representing the parts at the termination of the second stroke. The second stroke now being thus completed, the several parts then recommence the forward movement to make the third or finishing stroke, as shown in Fig. 17. As the eccentric F passes the forward "dead-center" the third-stroke hammer, H³, completely shapes the head, and at the same time impresses the nick $h^2$ therein by means of the die-cavity $h^3$, as shown in Fig. 18. Just after the hammer H³ leaves the thus-finished headed wire the action of the lever J', &c., withdraws the bolt from the lowest notch of the vertical bar R, as before described. At the same time the star-wheel V is, by means of the lever $y'$, &c., vibrated its angular distance, (i. e., one-ninth of a revolution,) the corresponding position being shown in Fig. 11. As the bolt is withdrawn from the said lowest notch $u^6$, the hammer-holder K', &c., drops by gravity until arrested by contact of the pin $l^2$ with the stationary lug $l^3$. (See Fig. 11.) By this means the first-stroke hammer, H', is again brought in line with the center of the machine. Instantly after the head $h'$ is finished the cams L L³ act to force the connection L' rearwardly, thereby slackening the toggle-jointed link and freeing the wire from the gripping-jaw N. Immediately succeeding the removal of the grip and the withdrawal of the last or lower hammer, H³, the cam P, (secured to the shaft S',) connection P', feed-block $r'$, &c., slowly start the head $h'$ from the solid die. As soon as the wire is started from the solid die, the cam T, by means of its connection and main feed-block X, feeds the wire endwise through the tubular guide Z' and between the several straightening-rolls $m$, the feed being adjusted to correspond to the desired length of blank to be produced, the relative arrangement of the feeding and gripping cams being such as to cause the gripper or clamp N to rigidly re-engage the wire immediately after the termination of the feeding operation and prior to the actual severing of the blank by the cutters E. At this time the key $k$ is, by means of the action of the clutch mechanism, withdrawn from the driving-pulley and pinion, thereby stopping the rotation of the shaft, the cross-head then being at the end of its third rear stroke, the shaft remaining stationary during one complete revolution. It is to be borne in mind, however, that the pulley and pinion, as one, are continuously revolving, although now turning upon the (for the time being) stationary shaft. When the pocket formed in the pulley arrives opposite or coincides with the head of the key, the latter is instantly forced by the action of a partly-concealed spring, $k^4$, Fig. 2, into the pocket, thereby again causing the upper shaft to revolve to head a new blank, the lower shaft being continuously revolving, while the upper one, as stated, intermittently turns. As soon as the clamps have grasped the wire, the two powerful side cams, C', in conjunction with the cam-slotted heads D and connected tool-holder frames $a$ $a'$, commence to force the latter transversely across the frame toward each other, which movement, by means of the cutters or dies E, adjustably mounted therein, both points the blank and severs it from the wire at the meeting of the adjacent cutting-faces $e^2$, (see Fig. 22,) the actual severance being accomplished while the cross-head remains stationary. The cross-head, &c., now advances upon its first stroke to again assist in making a blank, as before, the cutting-dies E at the same time being retracted to their normal position, the relation of the several devices to each other then being as represented in Figs. 1, 2, and 4. The blanks as finished may be automatically conducted into a suitable receptacle placed beneath the machine for the purpose.

By the employment of the tubular guide Z' the wire is prevented from "buckling" while being forced from the solid heading-die, as might otherwise be the case.

The die and hammers represented in the drawings are adapted to form round-headed screws, the slot of which lies wholly across the globular portion of the screw-heads.

Flat-headed screws require hammers of a special character, which are the subject of another application for a patent.

Another important advantage resulting from my invention is that by the employment of the cams and links, together with the thrust-plate and its cross-head, the "grip" or hold upon the wire is sufficient to overcome without slipping the pressure exerted by the heading-hammers in forming the head on the end of the wire or rod W. As the groove formed in the die E² of the gripping-clamp is smooth and of the same size as the wire, the blanks produced are much superior to those having their shanks roughened by the indentations of the holding-dies, as usually constructed.

It is obvious that many minor changes may be made in the machine hereinbefore described without departing from the spirit of the invention—as, for example, a single cam or projection may be secured to the upper shaft, and the tripping-lever P⁷ adapted to engage therewith in lieu of the cam P⁶, secured to the lower shaft. The star-wheel may have four lugs, v', (although I prefer three,) and the ratchet-wheel, &c., adapted to make one-twelfth of a turn at each revolution of the upper shaft—that is, if the three hammers be used. It is further obvious that by a slight change in the arrangement of the mechanism two or more heading-hammers may be employed and automatically operated.

Having thus described my invention, I claim—

1. In a machine for making screw-blanks, a gripping-clamp with its cavity forming an extension of the cylindrical hole of the separate solid die, which is provided with a cavity in which heads are to be formed to grasp and hold the wire in the proper position in the solid die against the thrust of the heading-hammers in upsetting the metal to form a head, substantially as set forth and described.

2. In a machine for making screw-blanks, the combination of two intermittent feeding devices, one of which grips the wire near the entrance of the supporting-tube which leads to the gripping-clamp and solid die and by a short movement starts the wire in the solid die, and the other of which grips the wire at a sufficient distance from the end of the supporting-tube to feed forward the length of wire required for a screw-blank, substantially as set forth and described.

3. In a machine for making screw-blanks, a series of three or more heading-hammers mounted in a support which is provided with means for bringing each hammer in turn into line with a die in which the head of a blank is to be formed, and means for locking it in such position until it has been forced against the metal in the die, substantially as set forth and described.

In testimony whereof I have affixed my signature in presence of two witnesses.

CHARLES D. ROGERS.

Witnesses:
CHARLES HANNIGAN,
GEO. H. REMINGTON.